(12) United States Patent
Kogetsu et al.

(10) Patent No.: US 10,566,598 B2
(45) Date of Patent: Feb. 18, 2020

(54) BATTERY HAVING SEPARATOR PROTECTION PROVIDED TO ELECTRODE

(71) Applicant: Panasonic Intellectual Property Management Co., Ltd., Osaka (JP)

(72) Inventors: Yasutaka Kogetsu, Osaka (JP); Sadayuki Okazaki, Osaka (JP); Katsuhisa Wadasaki, Osaka (JP); Yuki Suehiro, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 119 days.

(21) Appl. No.: 15/573,571

(22) PCT Filed: Jun. 15, 2016

(86) PCT No.: PCT/JP2016/002881
§ 371 (c)(1),
(2) Date: Nov. 13, 2017

(87) PCT Pub. No.: WO2017/010042
PCT Pub. Date: Jan. 19, 2017

(65) Prior Publication Data
US 2018/0145304 A1 May 24, 2018

(30) Foreign Application Priority Data
Jul. 10, 2015 (JP) ................................. 2015-138747

(51) Int. Cl.
*H01M 4/00* (2006.01)
*H01M 2/26* (2006.01)
(Continued)

(52) U.S. Cl.
CPC ............. *H01M 2/263* (2013.01); *H01M 2/34* (2013.01); *H01M 4/13* (2013.01); *H01M 6/16* (2013.01);
(Continued)

(58) Field of Classification Search
CPC ........ H01M 2/263; H01M 2/022; H01M 2/26; H01M 2/34; H01M 4/02; H01M 4/13;
(Continued)

(56) References Cited

U.S. PATENT DOCUMENTS

| 2013/0316209 | A1 | 11/2013 | Masumoto et al. |
| 2015/0050535 | A1* | 2/2015 | Amiruddin ........... H01M 4/133 |
| | | | 429/94 |

FOREIGN PATENT DOCUMENTS

| CN | 101807725 A | 8/2010 |
| JP | 2010-073653 | 4/2010 |
| WO | 2012/111061 | 8/2012 |

OTHER PUBLICATIONS

International Search Report of PCT application No. PCT/JP2016/002881 dated Sep. 20, 2016.
(Continued)

*Primary Examiner* — Raymond Alejandro
(74) *Attorney, Agent, or Firm* — McDermott Will & Emery LLP

(57) ABSTRACT

A winding-type battery includes an electrode group that is formed by winding a first electrode and a second electrode via a separator and has a first end surface and a second end surface. The first electrode includes a first current collector sheet, and a first active material layer formed on its surface. The second electrode includes a second current collector sheet, and a second active material layer formed on its surface. The first current collector sheet includes, at its end disposed on the first end surface of the electrode group, a
(Continued)

first uncoated portion having no first active material layer on either surface thereof. An edge surface of the first uncoated portion is at least partially covered with an insulating layer, and an end of the insulating layer projects more than an end of the separator on the first end surface.

9 Claims, 7 Drawing Sheets

(51) Int. Cl.
  *H01M 2/34*    (2006.01)
  *H01M 4/13*    (2010.01)
  *H01M 10/0587* (2010.01)
  *H01M 6/16*    (2006.01)
  *H01M 10/04*   (2006.01)
(52) U.S. Cl.
  CPC ... *H01M 10/0431* (2013.01); *H01M 10/0587* (2013.01)
(58) Field of Classification Search
  CPC ............ H01M 6/16; H01M 6/10; H01M 2/08; H01M 10/0431; H01M 10/04; H01M 10/0587; H01M 10/052; H01M 10/0525
  See application file for complete search history.

(56) References Cited

OTHER PUBLICATIONS

English Translation of Chinese Search Report dated Oct. 15, 2019 for the related Chinese Patent Application No. 201680033795.3.

\* cited by examiner (a) (b)

BATTERY HAVING SEPARATOR PROTECTION PROVIDED TO ELECTRODE

This application is a U.S. national stage application of the PCT International Application No. PCT/JP2016/002881 filed on Jun. 15, 2016, which claims the benefit of foreign priority of Japanese patent application 2015-138747 filed on Jul. 10, 2015, the contents all of which are incorporated herein by reference.

TECHNICAL FIELD

The present invention relates to a winding-type battery, particularly to a winding-type battery including a battery case having a tubular portion having a small outer diameter.

BACKGROUND ART

Recently, the performance of portable devices has been remarkably increasing. It is desired that power sources of such portable devices are small and have a high capacity. While, the manufacturing of high-capacity batteries becomes difficult as the sizes of the batteries become small.

Patent Literature 1 discloses a battery that includes a small cylindrical metal can and a sealing member for sealing an opening in the metal can. A winding-type electrode group is accommodated in the metal can. The electrode group includes first and second electrodes, and a separator is interposed between the electrodes. The separator projects on an end surface of the electrode group. The separator thus prevents contact between an electrode and the metal can that have different polarities, and prevents a short circuit between an end of one electrode and an end of the other electrode.

CITATION LIST

Patent Literature

PTL 1: International Patent Publication No. 2012/111061

SUMMARY OF THE INVENTION

In manufacturing a cylindrical winding-type battery, an electrode group is required to be inserted into a tubular portion of a battery case. At this time, generally, the electrode group is pressed into the tubular portion with a tool. At this time, when a flexible separator projects on an end surface of the electrode group as described in Patent Literature 1, the end surface is apt to deform. The deformation of the end surface of the electrode group makes it difficult to insert the electrode group into the tubular portion, and also causes an internal short circuit. The difficulty of avoiding the deformation of the end surface of such an electrode group becomes severe as the outer diameter of the tubular portion becomes small.

In view of the above-mentioned problems, a winding-type battery of one aspect of the present disclosure includes a power generating element and a battery case accommodating the power generating element. The battery case has a metal-made tubular portion. The power generating element includes a first electrode, a second electrode having a polarity different from that of the first electrode, a separator interposed between the first electrode and the second electrode, and an electrolyte. The first electrode and the second electrode are wound via the separator to form an electrode group having a first end surface and a second end surface opposite to the first end surface. The first electrode includes a first current collector sheet and a first active material layer formed on a surface of the first current collector sheet. A first current collecting lead is electrically connected to the first current collector sheet. The second electrode includes a second current collector sheet and a second active material layer formed on a surface of the second current collector sheet. A second current collecting lead is electrically connected to the second current collector sheet. The first current collector sheet includes, at its end disposed on the first end surface of the electrode group, a first uncoated portion having no first active material layer on either surface thereof. The first current collecting lead is connected to the first uncoated portion, an edge surface of the first uncoated portion is at least partially covered with an insulating layer, and the insulating layer projects more than the separator on the first end surface.

The present disclosure can provide a winding-type battery in which an end surface of the electrode group hardly deforms and an internal short circuit hardly occurs.

DESCRIPTION OF EMBODIMENT(S)

Figure 1:
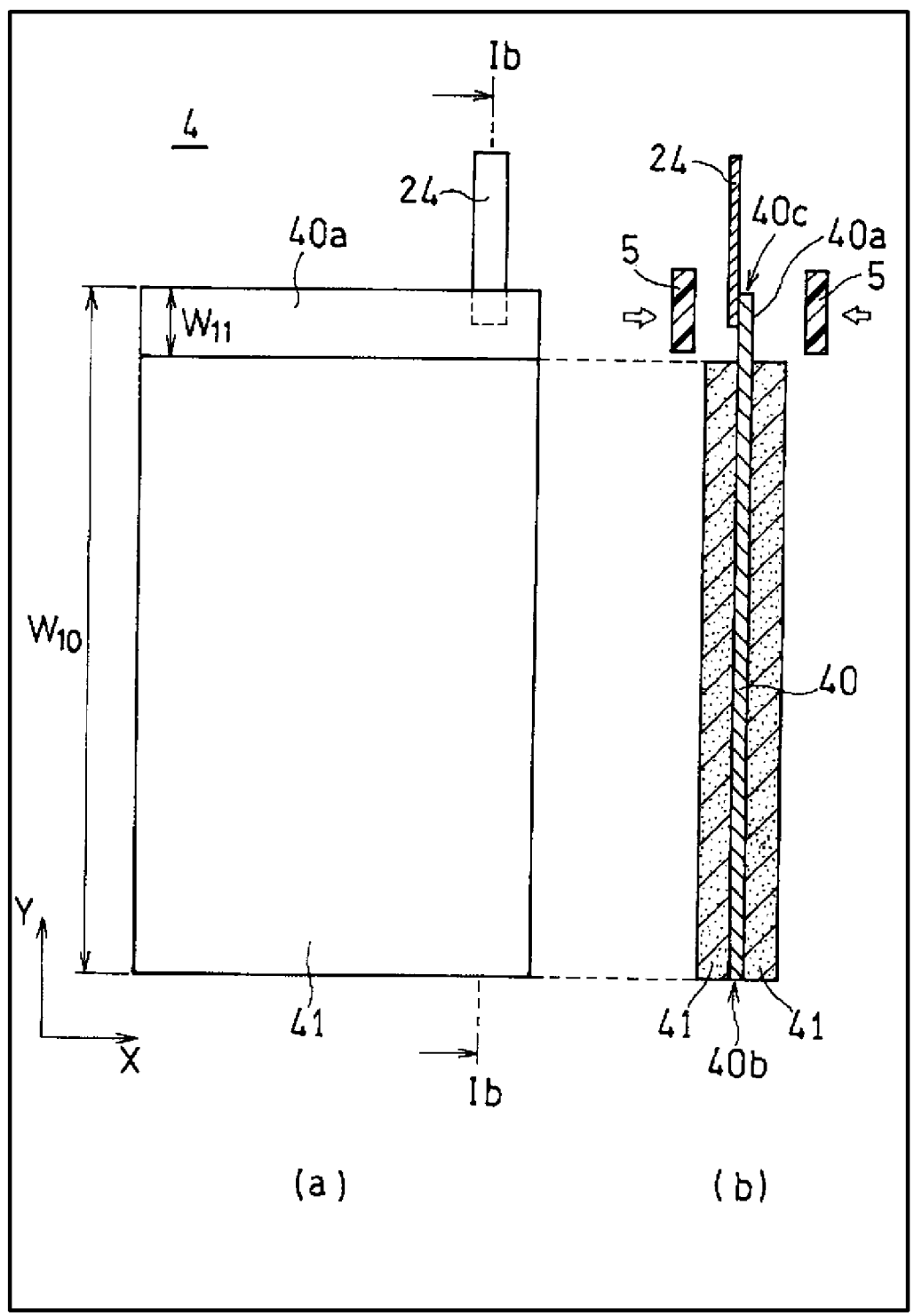
FIG. 1 is a diagram schematically showing a first electrode having a first uncoated portion connected to a first current collecting lead, (a) is a plan view schematically showing the first electrode having the first uncoated portion connected to the first current collecting lead, and (b) is a sectional view of the first electrode taken along line Ib-Ib.

A winding-type battery of the present disclosure includes a power generating element and a battery case accommodating the power generating element. The power generating element includes a first electrode, a second electrode having a polarity different from that of the first electrode, a separator interposed between the first electrode and the second electrode, and an electrolyte. The first electrode and the second electrode are wound via the separator to form an electrode group having a first end surface and a second end surface opposite to the first end surface.

The first electrode includes a first current collector sheet, and a first active material layer formed on a surface of the first current collector sheet. A first current collecting lead is electrically connected to the first current collector sheet. The second electrode includes a second current collector sheet, and a second active material layer formed on a surface of the second current collector sheet. A second current collecting lead is electrically connected to the second current collector sheet.

The first current collector sheet includes, at an end disposed on a first end surface of the electrode group, a first uncoated portion having no first active material layer on either surface thereof. The first current collecting lead is connected to the first uncoated portion. Thus, the end of the first current collector sheet in the direction perpendicular to the winding axis direction does not require an uncoated portion to be connected to the first current collecting lead. Therefore, unnecessary increase in diameter of the electrode group can be avoided.

In this structure, an edge surface of the first uncoated portion (namely, first current collector sheet) is at least partially covered with an insulating layer. The insulating layer projects more than the separator on the first end surface. Therefore, when a tool is pressed against the first end surface in pressing the electrode group into the tubular portion of the battery case, the tool is pressed against not an end of the separator but the insulating layer. Therefore, the first end surface hardly becomes deformed.

In order to suppress the deformation of the first end surface, at least a part of the edge surface of the first uncoated portion is covered with the insulating layer, and the insulating layer is projected more than the separator on the first end surface. In order to sufficiently suppress the deformation of the first end surface, preferably, a portion of the edge surface of the first uncoated portion that corresponds to at least one periphery of the electrode group, or 50% or more of one periphery, is covered with the insulating layer. At this time, the edge surface of the first uncoated portion that is covered with the insulating layer may be the innermost periphery of the first electrode constituting the electrode group, the outermost periphery thereof, or any periphery between the innermost periphery and the outermost periphery.

Preferably, at least one of the first current collecting lead and second current collecting lead is projected and extended from the first end surface. Thus, at the first end-surface side (for example, the opening side when the electrode group is inserted into a metal can), the first current collecting lead or second current collecting lead can be connected to the tubular portion of the battery case. Therefore, even when the outer diameter of the tubular portion is small, the connection can be easily performed.

Preferably, the first current collecting lead or second current collecting lead is electrically connected to a connection position on the inner surface of the tubular portion that does not face the electrode group. The electrical connection is achieved by resistance welding using an electrode for welding, for example. At the connection position that does not face the electrode group, welding work of a lead to the tubular portion is easily performed. Furthermore, since the insulating layer projects on the first end surface, the separator hardly comes into contact with the electrode for welding even when the connection position between the lead and the tubular portion is close to the first end surface, and the accident in which the separator is captured between the electrode for welding and the lead or tubular portion is avoided.

The battery case includes a bottomed metal can having a tubular portion and a sealing member for blocking the opening in the metal can, for example. The first end surface is disposed on the opening side. In this structure, preferably, both of the first current collecting lead and second current collecting lead are projected from the first end surface, one of the first current collecting lead and second current collecting lead is connected to the connection position on the inner surface of the tubular portion that does not face the electrode group, and the other is connected to the sealing member.

In the case that the second current collecting lead is connected to the tubular portion, the first electrode has a polarity different from that of the metal can. However, since the edge surface of the first uncoated portion of the first electrode is at least partially covered with the insulating layer and the insulating layer projects more than the separator, the contact between the inner surface of the metal can and the first uncoated portion is suppressed. In order to significantly suppress such a contact, preferably, the edge surface of the first uncoated portion is covered with the insulating layer by 30% or more from the end surface as the winding termination position disposed on at least the outermost periphery. More preferably, 100% of the edge surface is covered with the insulating layer. When a part of the edge surface of the first uncoated portion is not covered with the insulating layer, it is preferable that the separator is projected more than the non-covered part.

Preferably, the shortest distance, in the winding axis direction, between the insulating layer and the connection position on the inner surface of the tubular portion to the lead is 0.3 mm or more and 3 mm or less. Thus, increase in the length of the tubular portion can be avoided, and the energy density of the battery is effectively increased. Furthermore, increase in the length of the lead can be avoided, and an internal short circuit can be prevented from being caused by a positional displacement of the lead.

Generally, the insulating layer is made of a material having a thickness greater than that of the separator and having a high bending rigidity. Preferably, the insulating layer includes a non-porous sheet material, which is not porous, for example. While, the separator is porous and flexible.

Preferably, insulating tape is used as the insulating layer. The insulating tape includes an insulating sheet and an adhesive layer disposed on one surface of the insulating sheet. As the insulating sheet, a non-porous sheet material can be employed. Using the insulating tape facilitates work of covering the edge surface of the first uncoated portion with the insulating layer, and can reduce the manufacturing cost. By grasping the first uncoated portion with a pair of insulating tapes from both sides, for example, the edge surface of the first uncoated portion can be covered with the insulating layer. At this time, the insulating tape overhangs from the edge surface of the first uncoated portion to the first end-surface side. Therefore, a root (a portion near the end surface of the first uncoated portion) of the first current collecting lead is fixed via the insulating layer, and the motion of the first current collecting lead is suppressed. Thus, the first current collecting lead is restrained so as to face directly upward, and the risk that an internal short circuit is caused by the first current collecting lead is reduced.

Preferably, the thickness of the insulating layer is 15 μm or more and 50 μm or less, for example. When the thickness is 15 μm or more, a high insulation property can be kept. When the thickness is 50 μm or less, distortion by the insulating layer hardly affects the electrode group and the first electrode can be easily wound even when the electrode group has a small outer diameter. Generally, an insulating layer having a thickness greater than that of the separator is employed.

From the viewpoint of fixing the root of the first current collecting lead, preferably, at least an overlapping portion of the first current collecting lead and the first uncoated portion is covered with the insulating layer. From the viewpoint of preventing an internal short circuit, it is preferable that 90% or more of the total area of both surfaces of the first uncoated portion is covered with the insulating layer. When the insulating layer is disposed along the full length of the first electrode disposed on the first end surface, preferably, the insulating layer overhangs from the edge surface of the first uncoated portion along the full length.

Preferably, a second uncoated portion having no second active material layer on at least one surface thereof is formed at one end of the second current collector sheet in the direction perpendicular to the winding axis of the electrode group. In this case, the second current collecting lead is connected to the second uncoated portion.

Preferably, the second uncoated portion is disposed in a band shape along the one end. Thus, the second current collecting lead is easily extended from the first end surface toward the opening side. Here, the other end of the second current collector sheet in the direction perpendicular to the winding axis may coincide with an end of the second active material layer, or may include an uncoated portion on which the second current collector sheet is exposed. Preferably, such an uncoated portion is also disposed in a band shape along the other end.

Preferably, the opposite ends of the second current collector sheet in the winding axis direction of the electrode group coincide with the opposite ends of the second active material layer in the same direction. In other words, preferably, both surfaces of the opposite ends in the winding axis direction have a second active material layer. Thus, the facing surface area of the second active material layer and first active material layer can be sufficiently increased. The risk that an internal short circuit is caused by the contact between the second current collector sheet and the first uncoated portion can be significantly reduced.

At this time, the second active material layer is not required to cover up to the edge surfaces of the opposite ends of the second current collector sheet in the winding axis direction. The second active material layer is not required to cover each end over the full length. For example, it is sufficient that 50% or more of the full length of each end is covered with the second active material layer.

Preferably, the opposite ends of the first current collector sheet in the direction perpendicular to the winding axis direction coincide with the opposite ends of the first active material layer in the same direction. In other words, preferably, both surfaces of the opposite ends in the direction perpendicular to the winding axis direction have a first active material layer. Thus, the facing surface area of the first active material layer and second active material layer can be sufficiently increased. Also in this case, the first active material layer is not required to cover up to the edge surface of each end. Furthermore, it is sufficient that 50% or more of the full length of each end is covered with the first active material layer.

The importance of suppressing the deformation of the first end surface increases especially when the tubular portion of the battery case has an outer diameter of 10 mm or less for example, furthermore 6 mm or less, and especially 4.5 mm or less. That is because, when the outer diameter of the tubular portion decreases, the electrode group is difficult to be pressed into the battery case. Here, the outer diameter is, for example, the outer diameter of the cross section perpendicular to the axial direction of the metal can.

From the viewpoint of keeping the strength, preferably, the metal can is made of stainless steel and the can wall has a thickness of 0.05 mm to 0.2 mm. This condition allows the achievement of a small winding-type battery having a high capacity and a high strength. However, the outer diameter of a cylindrical metal can is difficult to be made less than 1 mm, and it is preferable that the outer diameter is 1 mm or more.

Hereinafter, taking, as an example, the case that the first electrode is a positive electrode and the second electrode is a negative electrode, an exemplary embodiment of the present invention is described in detail with reference to the accompanying drawings. For simplifying the description, elements having substantially the same functions are denoted by the same reference marks in the following drawings.

Here, the winding axis direction of the electrode group is referred to as "first direction", and the direction perpendicular to the winding axis direction is referred to as "second direction".

(Positive Electrode)

As shown in FIG. 1, positive electrode 4 includes: positive-electrode current collector sheet 40 as the first current collector sheet; and positive-electrode active material layers 41 formed on the opposite surfaces of positive-electrode current collector sheet 40. Positive-electrode current collector sheet 40 has a rectangular shape. In the present exemplary embodiment, the longitudinal direction (Y direction in FIG. 1) coincides with the winding axis direction (first direction). One end (hereinafter, first end) in the first direction includes first uncoated portion 40a on which positive-electrode current collector sheet 40 is exposed. The first end is disposed on the first end-surface side of the electrode group. First uncoated portion 40a is disposed in a band shape along the first end. One end of strip-shaped positive-electrode current collecting lead 24 is connected to first uncoated portion 40a by welding.

At the other end (hereinafter, second end) of positive electrode 4 in the first direction, the positive-electrode current collector sheet is not exposed, and positive-electrode active material layer 41 is formed on the whole of both surfaces except edge surface 40b of the second end. Also at each of the opposite ends of positive-electrode current collector sheet 40 in the second direction (X direction in FIG. 1), the whole of both surfaces except the edge surface and the portion corresponding to the first uncoated portion is covered with positive-electrode active material layer 41. A positive electrode having such a structure can be easily manufactured by the following steps:

producing an original electrode by coating a large material sheet for positive-electrode current collector sheet 40 with a material mixture of positive-electrode active material layer 41 in a stripe shape; and then cutting the original electrode into a predetermined shape.

Here, "edge surface" corresponds to the cross section in the thickness direction that is formed when the current collector sheet is cut.

Width $W_{10}$ of positive-electrode current collector sheet 40 in the first direction is selected in accordance with the length of the metal can or the battery capacity. Width $W_{11}$ of first uncoated portion 40a is preferably 2 mm to 4 mm. When width $W_{11}$ is within this range, the surface area of positive-electrode active material layer 41 formed on the surface of positive-electrode current collector sheet 40 can be sufficiently increased, and also the strength of a junction to positive-electrode current collecting lead 24 is easily kept.

Figure 2:
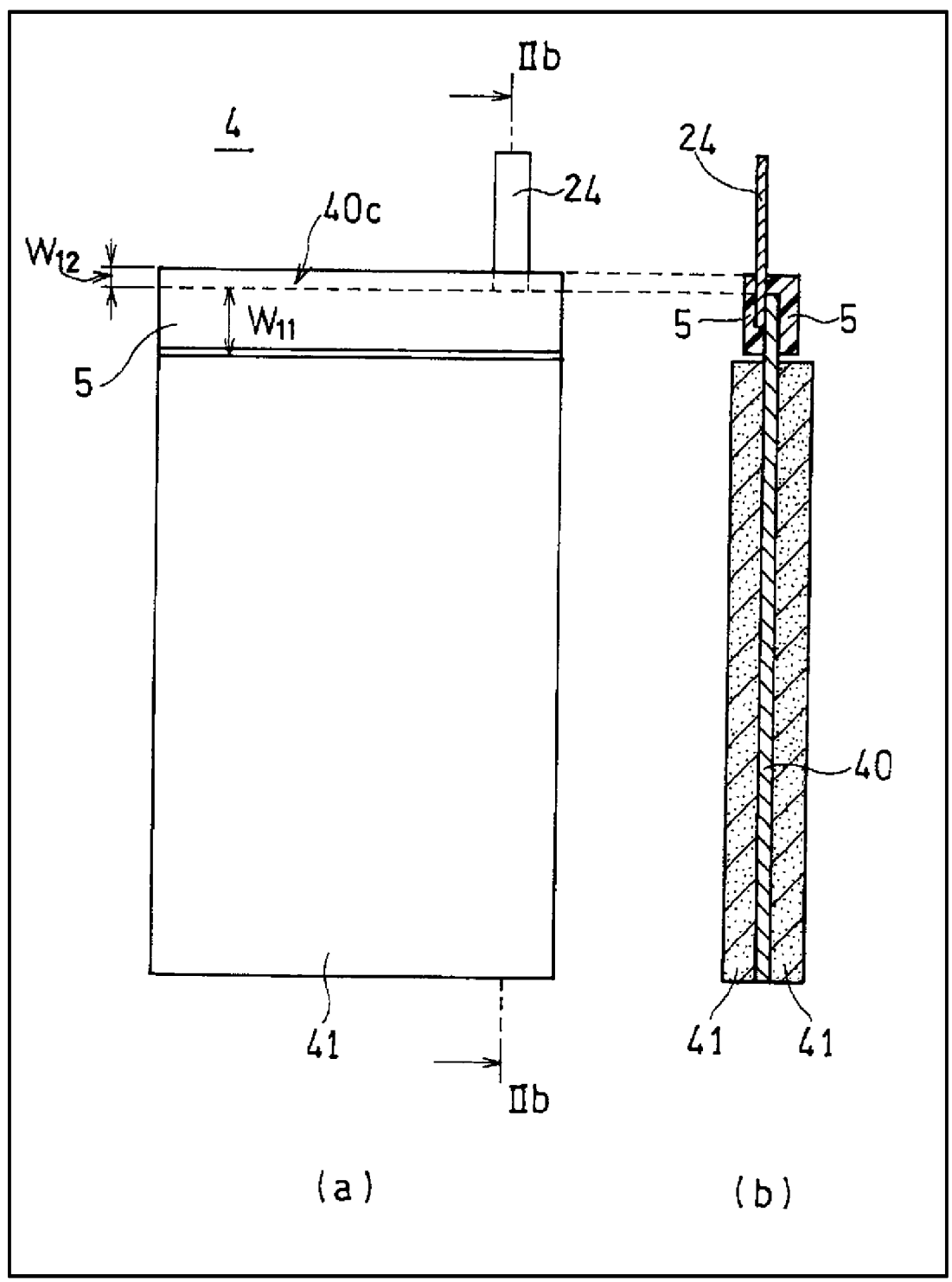
FIG. 2 is a diagram schematically showing a first electrode having the first uncoated portion that is connected to the first current collecting lead and is covered with an insulating layer, (a) is a plan view schematically showing the first electrode having the first uncoated portion that is connected to the first current collecting lead and is covered with the insulating layer, and (b) is a sectional view of the first electrode taken along line IIb-IIb.

FIG. 2 schematically shows the state in which the front and rear surfaces of first uncoated portion 40a of positive-electrode current collector sheet 40 are covered with insulating layer 5. Insulating layer 5 is disposed in a band shape along the first end so as to cover edge surface 40c of the first end (first uncoated portion 40a).

When edge surface 40c is covered with insulating layer 5, insulating layer 5 slightly overhangs from edge surface 40c of first uncoated portion 40a. Thus, the risk that an internal short circuit is caused by the existence of first uncoated portion 40a is reduced. An overlapping portion of positive-electrode current collecting lead 24 and first uncoated portion 40a is covered with insulating layer 5, and the root of positive-electrode current collecting lead 24 is fixed via insulating layer 5. Therefore, the motion of positive-electrode current collecting lead 24 is suppressed, and the risk that an internal short circuit is caused by positive-electrode current collecting lead 24 is also reduced.

Overhang width $W_{12}$ of insulating layer 5 from edge surface 40c of first uncoated portion 40a is preferably 0.1 mm to 1 mm, more preferably 0.4 mm to 0.6 mm. Thus, the effect of fixing the root of positive-electrode current collecting lead 24 via insulating layer 5 is enhanced, and unnecessary increase in the length of the electrode group in the first direction can be avoided.

FIG. 2 shows the state in which first uncoated portion 40a is not completely covered with insulating layer 5. However, preferably 90% or more of the total area of both surfaces of first uncoated portion 40a is covered with insulating layer 5. More preferably, first uncoated portion 40a is completely covered with insulating layer 5.

Insulating layer 5 is made of an insulating material. As the insulating material, a pressure sensitive adhesive containing an insulating resin component preferable. For example, a rubber pressure sensitive adhesive, an acrylic pressure sensitive adhesive, a silicone pressure sensitive adhesive, or a urethane pressure sensitive adhesive can be employed. The pressure sensitive adhesive includes, in addition to the resin component, a tackifier, a cross-linker, a softener, or an anti-aging agent if necessary. The rubber pressure sensitive adhesive includes a rubber component such as natural rubber, butyl rubber, or isoprene rubber. The acrylic pressure sensitive adhesive includes a polymer of acrylic monomer such as acrylonitrile, (metha) acrylic acid, or (metha) acrylic acid ester. The silicone pressure sensitive adhesive includes polysiloxane or silicone rubber.

As insulating layer 5, insulating tape may be employed. Using the insulating tape facilitates work of covering first uncoated portion 40a with the insulating layer. The insulating tape includes an insulating sheet (substrate film), and a pressure sensitive adhesive layer disposed on one surface of the insulating sheet. The pressure sensitive adhesive layer includes the above-mentioned pressure sensitive adhesive.

The insulating sheet may include a film of polyolefin or engineering plastic. This film is, for example, a polypropylene film, a polyethylene terephthalate film, a polyimide film, or a polyphenylene sulfide (PPS) film. Especially, a non-porous polypropylene film having a thickness of 15 μm to 50 μm is preferable because the influence of distortion on the electrode group is small.

The thickness of insulating layer 5 is preferably equal to or smaller than the thickness of the positive-electrode active material layer, more preferably 20% to 50% of the thickness of the positive-electrode active material layer. Disposing insulating layer 5 having such a thickness on the first uncoated portion produces the following advantage: even when an electrode group having a small diameter is formed, distortion by insulating layer 5 hardly affects the electrode group, and a local variation in the inner pressure of the electrode group is suppressed.

The thickness of insulating layer 5 is preferably 15 μm to 50 μm, more preferably 20 μm to 40 μm.

Positive-electrode current collector sheet 40 is a porous or non-porous conductive substrate.

In the case that the winding-type battery is a lithium-ion battery, preferably, metal foil of aluminum or aluminum alloy is employed as the material of positive-electrode current collector sheet 40, for example. The thickness of the positive-electrode current collector sheet is not particularly limited, but is preferably 10 μm to 20 μm.

Positive-electrode active material layer 41 includes a positive-electrode active material as an essential component, and includes a binder and conductive agent as optional components. As the positive-electrode active material of a lithium-ion secondary battery, a composite oxide containing lithium is preferable, and $LiCoO_2$, $LiNiO_2$, or $LiMn_2O_4$ is employed for example. As the positive-electrode active material of a lithium-ion primary battery, manganese dioxide or graphite fluoride is employed. In producing positive-electrode active material layer 41, a positive-electrode material mixture containing a positive-electrode active material is mixed with a liquid component to prepare positive-electrode slurry. Next, the surface of the positive-electrode current collector sheet is coated with the positive-electrode slurry, and the coated film is dried. Next, the dried coated film is rolled together with the positive-electrode current collector sheet, thereby producing a positive-electrode active material layer having a predetermined thickness. The thickness of the positive-electrode active material layer is not particularly limited, but is preferably 70 μm to 130 μm.

As the material of positive-electrode current collecting lead 24 in a lithium-ion battery, preferably, aluminum, aluminum alloy, nickel, nickel alloy, iron, or stainless steel is employed, for example. The thickness of positive-electrode current collecting lead 24 is preferably 10 μm to 120 μm, more preferably 20 μm to 80 μm. The shape of positive-electrode current collecting lead 24 is not particularly limited. However, positive-electrode current collecting lead 24 has a stripe shape having a width of 0.5 mm to 3 mm and a length of 3 mm to 10 mm, for example.

(Negative Electrode)

Figure 3:
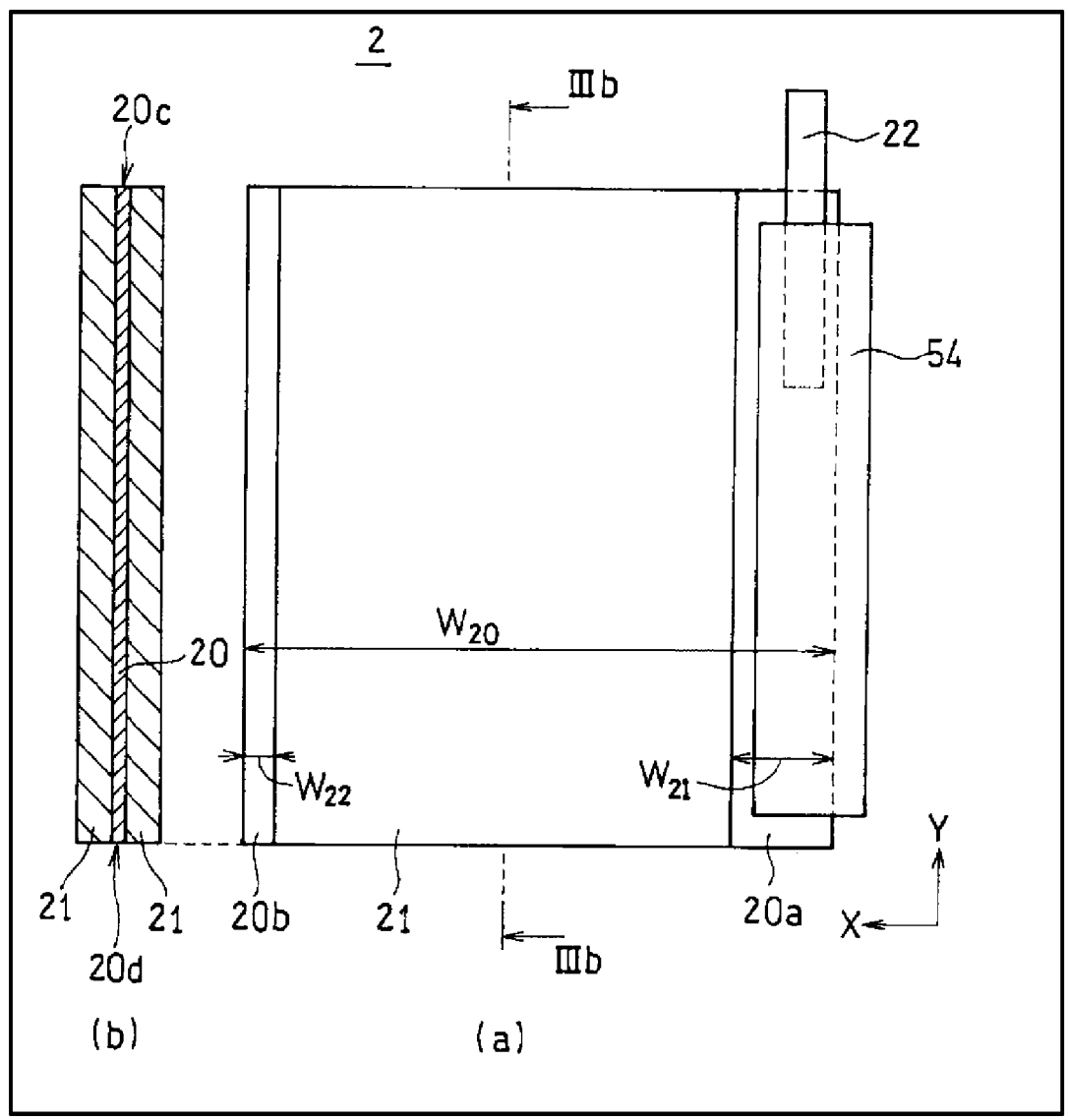
FIG. 3 is a diagram schematically showing a second electrode having a second uncoated portion connected to a second current collecting lead, (a) is a plan view schematically showing the second electrode having the second uncoated portion connected to the second current collecting lead, and (b) is a sectional view of the second electrode taken along line IIIb-IIIb.

As shown in FIG. 3, negative electrode 2 includes: negative-electrode current collector sheet 20 as the second current collector sheet; and negative-electrode active material layers 21 formed on the opposite surfaces of negative-electrode current collector sheet 20. Negative-electrode current collector sheet 20 has a rectangular shape in which the length in the second direction is set longer than that of positive-electrode current collector sheet 40. One end (hereinafter, first end) in the second direction (X direction in FIG. 3) of negative-electrode current collector sheet 20 includes a relatively wide second uncoated portion (A) 20a on which the negative-electrode current collector sheet is exposed. Second uncoated portion (A) 20a is disposed in a band shape along the first end. Second uncoated portion (A) 20a is connected to one end of strip-shaped negative-electrode current collecting lead 22 by welding.

The other end (hereinafter, second end) of negative-electrode current collector sheet 20 in the second direction includes a band-shaped second uncoated portion (B) 20b on which negative-electrode current collector sheet 20 is exposed. Such an exposed portion of negative-electrode current collector sheet 20 is disposed for suppressing the peeling of the negative-electrode active material layer.

The opposite ends of negative-electrode current collector sheet 20 in the first direction (Y direction in FIG. 3) are covered with negative-electrode active material layer 21, except edge surfaces 20c and 20d at the opposite ends and the portions corresponding to second uncoated portions 20a and 20b. Thus, the facing surface area of positive-electrode active material layer 41 and negative-electrode active material layer 21 can be sufficiently increased, and the risk that an internal short circuit is caused by the contact between first uncoated portion 40a and negative-electrode current collector sheet 20 can be significantly reduced.

Preferably, width $W_{21}$ of second uncoated portion (A) 20a is 10% to 50% of width $W_{20}$ of negative-electrode current collector sheet 20 in the second direction. When width $W_{21}$ is within this range, the surface area of negative-electrode active material layer 21 formed on the surface of negative-electrode current collector sheet 20 can be sufficiently increased, and the strength of a junction to negative-electrode current collecting lead 22 is easily kept. While, width $W_{22}$ of second uncoated portion (B) 20b is required to be 1% to 10% of width $W_{20}$. Second uncoated portion (B) 20b is not always necessary. A negative-electrode active material layer may be formed in at least a part of the rear surface of each of second uncoated portions 20a and 20b. Alternatively, the rear surface of each of second uncoated portions 20a and 20b may be an uncoated portion on which a negative-electrode current collector sheet is exposed, similarly to the front surfaces.

Negative-electrode current collector sheet 20 is a porous or non-porous conductive substrate. When the winding-type battery is a lithium-ion battery, preferably, metal foil of stainless steel, nickel, copper, copper alloy, or aluminum is employed as the material of the negative-electrode current collector sheet, for example. The thickness of the negative-electrode current collector sheet is not particularly limited, but is preferably 5 μm to 20 μm.

Negative-electrode active material layer 21 includes a negative-electrode active material as an essential component, and includes a binder and conductive agent as optional components. As the negative-electrode active material of the lithium-ion battery, metal lithium, an alloy (silicon alloy or tin alloy), a carbon material (graphite or hard carbon), a silicon compound, a tin compound, or a lithium titanate compound is employed. In producing negative-electrode active material layer 21, a negative-electrode material mixture containing a negative-electrode active material is mixed with a liquid component to prepare negative-electrode slurry. Next, the surface of the negative-electrode current collector sheet is coated with the negative-electrode slurry, and the coated film is dried. Next, the dried coated film is rolled together with the negative-electrode current collector sheet, thereby producing a negative-electrode active material layer having a predetermined thickness. The thickness of the negative-electrode active material layer is not particularly limited, but is preferably 70 μm to 150 μm. When the negative-electrode active material is an alloy or compound, an active material layer may be produced through a vacuum process.

As the material of negative-electrode current collecting lead 22 of the lithium-ion battery, preferably, nickel, nickel alloy, iron, stainless steel, copper, or copper alloy is employed, for example. The thickness of negative-electrode current collecting lead 22 is preferably 10 μm to 120 μm, more preferably 20 μm to 80 μm. The shape of negative-electrode current collecting lead 22 is not particularly limited. However, negative-electrode current collecting lead 22 has a stripe shape having a width of 0.5 mm to 3 mm and a length of 9 mm to 15 mm, for example.

As the binder usable for the positive-electrode active material layer and/or the negative-electrode active material layer, for example, fluorine resin (polyvinylidene fluoride or polytetrafluoroethylene), polyamide, polyimide, polyamide-imide, polyacrylic acid, or styrene-butadiene rubber is employed. As the conductive agent usable for the positive-electrode active material layer and/or the negative-electrode active material layer, graphite, carbon black, or carbon fiber is employed, for example.

FIG. 3 schematically shows the state in which negative-electrode current collecting lead 22 is connected to second uncoated portion (A) 20a and fixing insulating tape 54 is pasted on second uncoated portion (A) 20a. Fixing insulating tape 54 is used for fixing the outermost periphery of the electrode group after winding, but also partially covers an overlapping portion of negative-electrode current collecting lead 22 and second uncoated portion (A) 20a. Thus, a connection portion between negative-electrode current collecting lead 22 and negative-electrode current collector sheet 20 is easily kept.

Figure 4:
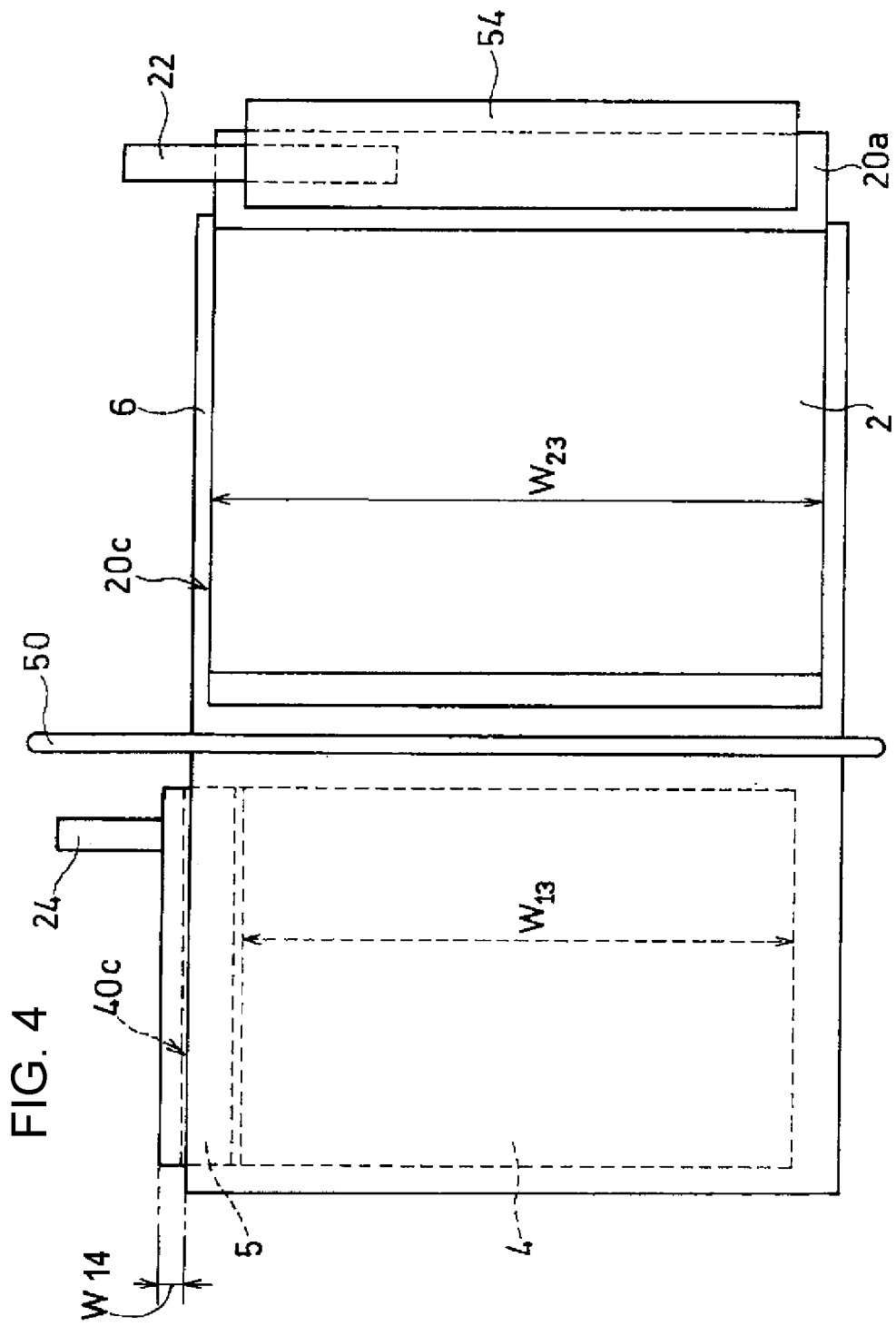
FIG. 4 is a plan view schematically showing a configuration of an electrode group before winding.

FIG. 4 is a plan view schematically showing the configuration of the electrode group before winding.

In the shown example, with respect to separator 6, positive electrode 4 is disposed on the left and rear side of separator 6 and negative electrode 2 is disposed on the right and front side of separator 6. Width $W_{13}$ of positive-electrode active material layer 41 in the winding axis direction (first direction) is slightly narrower than width $W_{23}$ of negative-electrode active material layer 21 in the first direction. Thus, positive electrode 4 and negative electrode 2 are stacked so that positive-electrode active material layer 41 is completely overlaid on negative-electrode active material layer 21. Such a stacked body of positive electrode 4, separator 6, and negative electrode 2 is wound about winding core 50, thereby producing an electrode group.

Insulating layer 5 for covering first uncoated portion 40a of positive electrode 4 projects more than one end (first end-surface side) of separator 6 in the first direction. While, the other end of separator 6 in the first direction projects more than an end of positive electrode 4. The opposite ends of separator 6 in the first direction project more than the opposite ends of negative electrode 2 in the first direction. Thus, insulating layer 5 can be projected on the first end surface of the electrode group, and the risk of an internal short circuit is also reduced. Edge surface 40c of first uncoated portion 40a projects more than edge surface 20c of negative-electrode current collector sheet 20. Thus, the connection region between first uncoated portion 40a and positive-electrode current collecting lead 24 can be kept, and strong connection is allowed.

Projection width $W_{14}$ of insulating layer 5 from separator 6 on the first end surface is not particularly limited. Insulating layer 5 is just required to slightly project more than separator 6. In consideration of the possibility of winding displacement, however, projection width $W_{14}$ is preferably 0.1 mm or more, more preferably 0.2 mm or more, for example. From the viewpoint of avoiding the increase in the length of the tubular portion of the battery case, projection width $W_{14}$ is preferably 2.0 mm or less, more preferably 0.5 mm or less, for example.

In the shown example, the position of edge surface 20c of the negative-electrode current collector sheet faces, via separator 6, insulating layer 5 that covers first uncoated portion 40a of positive electrode 4. Therefore, even if separator 6 displaces, the contact of edge surface 20c of the negative-electrode current collector sheet with first uncoated portion 40a is avoided, and the risk of an internal short circuit is significantly reduced.

Figure 5:
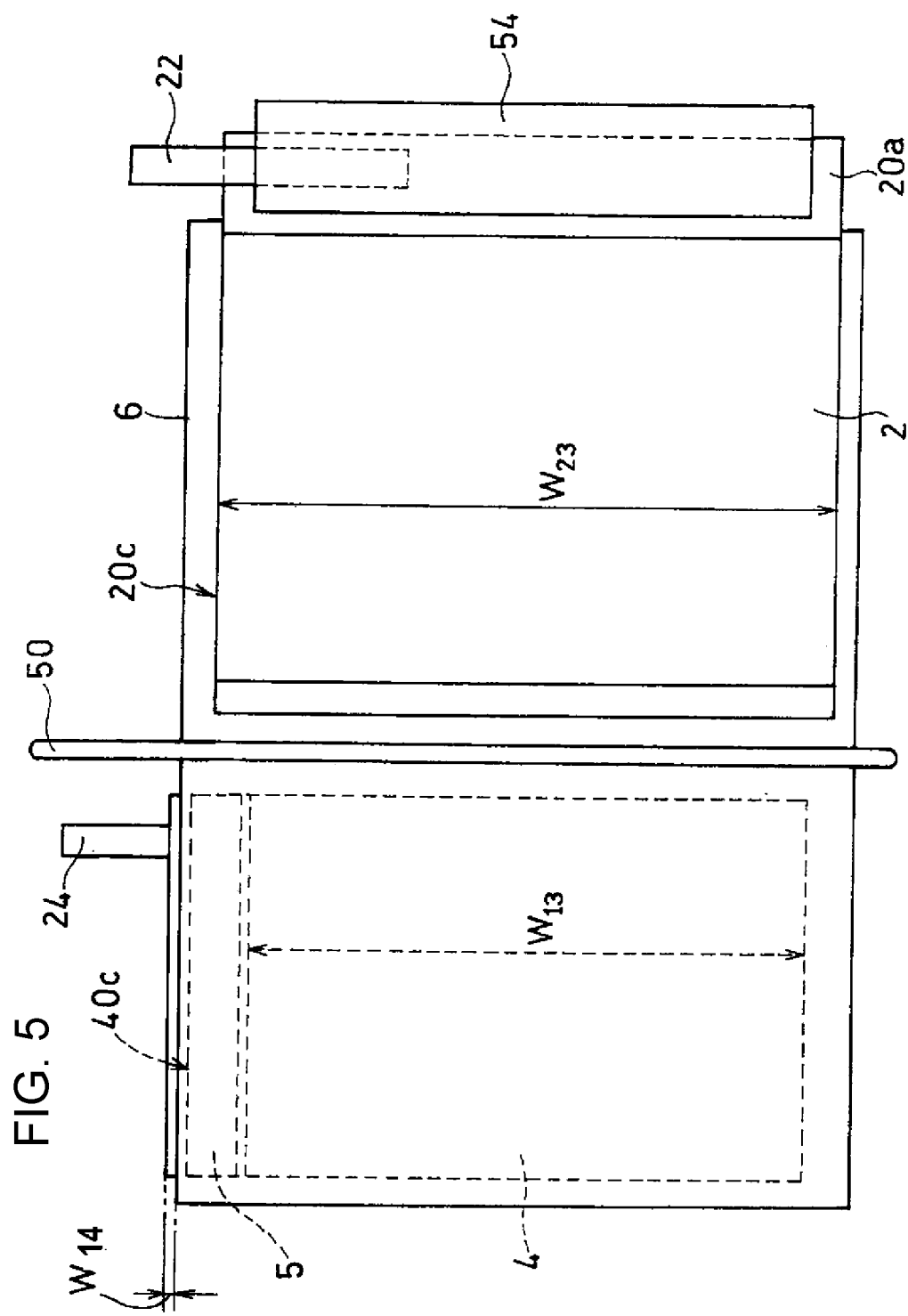
FIG. 5 is a plan view schematically showing another configuration of the electrode group before winding.

In FIG. 4, edge surface 40c of first uncoated portion 40a projects more than an end of separator 6, but the positional relationship is not limited to this. As shown in FIG. 5, the end of separator 6 may project more than edge surface 40c of first uncoated portion 40a. In the case of FIG. 5, even if a part of insulating layer 5 peels from first uncoated portion 40a, edge surface 40c of first uncoated portion 40a faces separator 6. Therefore, the risk of an internal short circuit is kept still low.

One end (second uncoated portion (A) 20a) of negative electrode 2 in the second direction overhangs from separator 6. The overhanging portion faces the inner surface of the side wall of the tubular portion or metal can.

Figure 6:
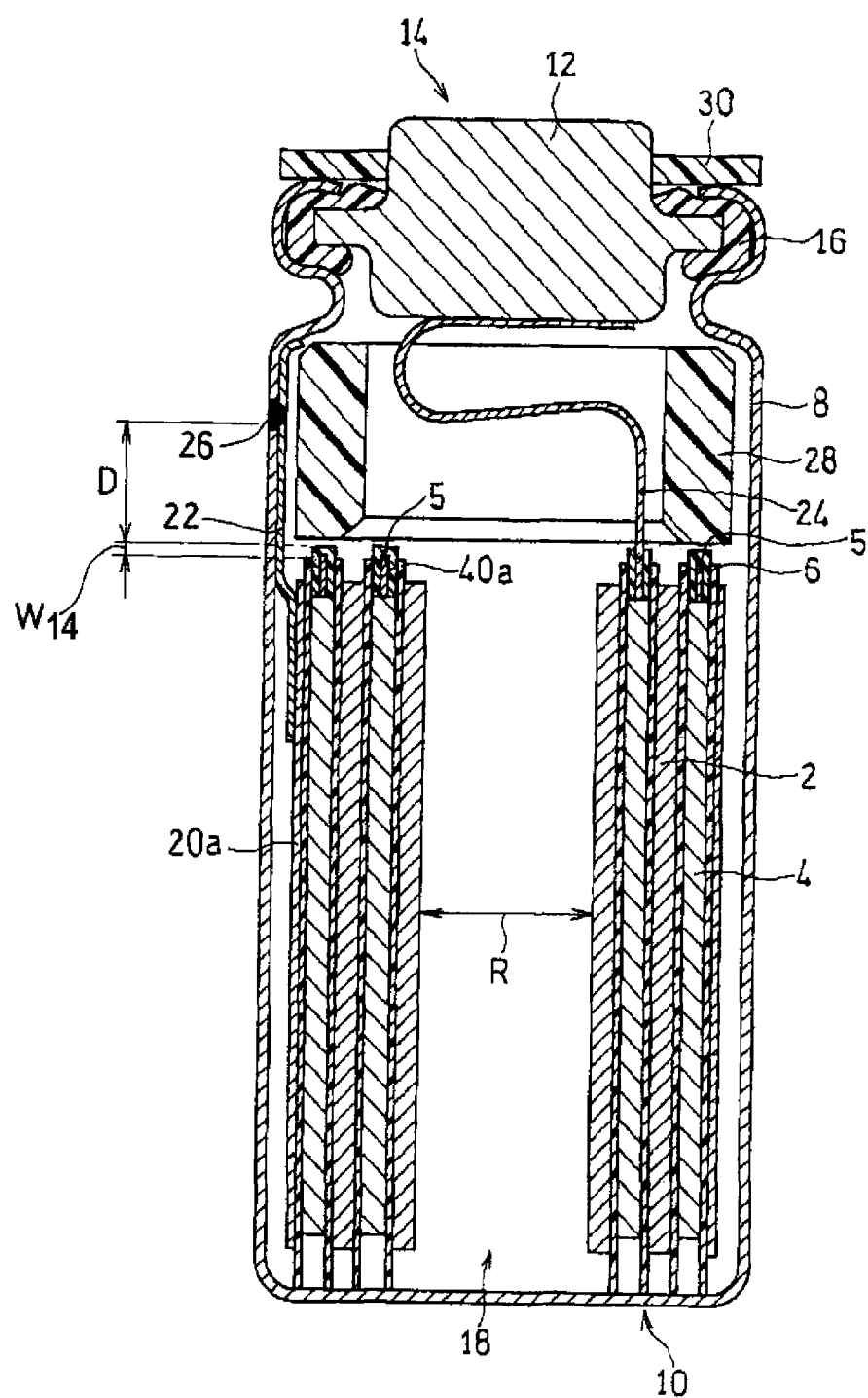
FIG. 6 is a vertical sectional view of a cylindrical winding-type battery in accordance with an exemplary embodiment of the present invention.

FIG. 6 is a vertical sectional view of a cylindrical winding-type battery in accordance with the exemplary embodiment of the present invention.

A power generating element of a winding-type battery includes positive electrode 4 as a first electrode, negative electrode 2 as a second electrode, separator 6 interposed between the first electrode and the second electrode, and an electrolyte (not shown). Positive electrode 4 and negative electrode 2 are wound via separator 6 to produce a winding-type electrode group. The battery case includes bottomed cylindrical metal can 8 and sealing member 12 for sealing an opening in metal can 8. The winding axis of the electrode group coincides with the center axis of metal can 8, the proximity of the winding axis forms hollow portion 18 (diameter R) having no power generating element.

When the curvature radius of the winding start portion is too small, an active material layer can peel from a current collector sheet. Therefore, it is necessary that the diameter of winding core 50 is not too small. While, when the diameter of winding core 50 is too large, the battery capacity decreases. It is preferable to select winding core 50 so that the diameter of the hollow portion of the electrode group is 3 mm or less, preferably less than 1.5 mm. The winding core may be left in the battery without being pulled out.

After the stacked body is wound to produce an electrode group, winding core 50 is pulled out. Therefore, a hollow portion of diameter R is formed in the center of the electrode group. Then, the electrode group is accommodated in metal can 8. At this time, the electrode group is inserted from the second end-surface side into metal can 8, and the first end surface from which negative-electrode current collecting lead 22 and positive-electrode current collecting lead 24 are projected is disposed on the opening side of metal can 8. The electrode group is pressed into metal can 8 with a pin-shaped tool until the second end surface arrives at the bottom of metal can 8. During this operation, the top of the tool is pressed against the first end surface of the electrode group. At this time, since insulating layer 5 projects from the first end surface, the deformation of the first end surface is avoided or suppressed.

One end of negative-electrode current collecting lead 22 is electrically connected to the exposed portion (second uncoated portion (A) 20a) of the negative-electrode current collector sheet of negative electrode 2. The other end of negative-electrode current collecting lead 22 is extended to the opening side of metal can 8 and is connected to connection position 26 on the inner surface of the side wall (tubular portion) near the opening in metal can 8. Metal can 8 also serves as negative-electrode terminal 10. The connection between negative-electrode current collecting lead 22 and connection position 26 is performed by spot welding, for example. At this time, shortest distance D between insulating layer 5 and connection position (welding point) 26 in the winding axis direction is set at preferably 0.3 mm to 3 mm, more preferably 0.5 mm to 1.5 mm.

Next, insulating ring-shaped intermediate member 28 is disposed on the first end surface of the electrode group, and one end of positive-electrode current collecting lead 24 extending from first uncoated portion 40a disposed on the first end surface is connected to the lower surface of conductive sealing member 12 by welding. In other words, sealing member 12 also serves as positive-electrode terminal 14.

Then, an electrolyte is injected into metal can 8 by a depressurization method. Finally, the opening end of metal can 8 is caulked to sealing member 12 via insulating member (gasket) 16, thereby producing a cylindrical winding-type battery. Insulating ring member 30 is disposed on a rim of sealing member 12, and insulation between metal can 8 and sealing member 12 is secured.

Figure 7:
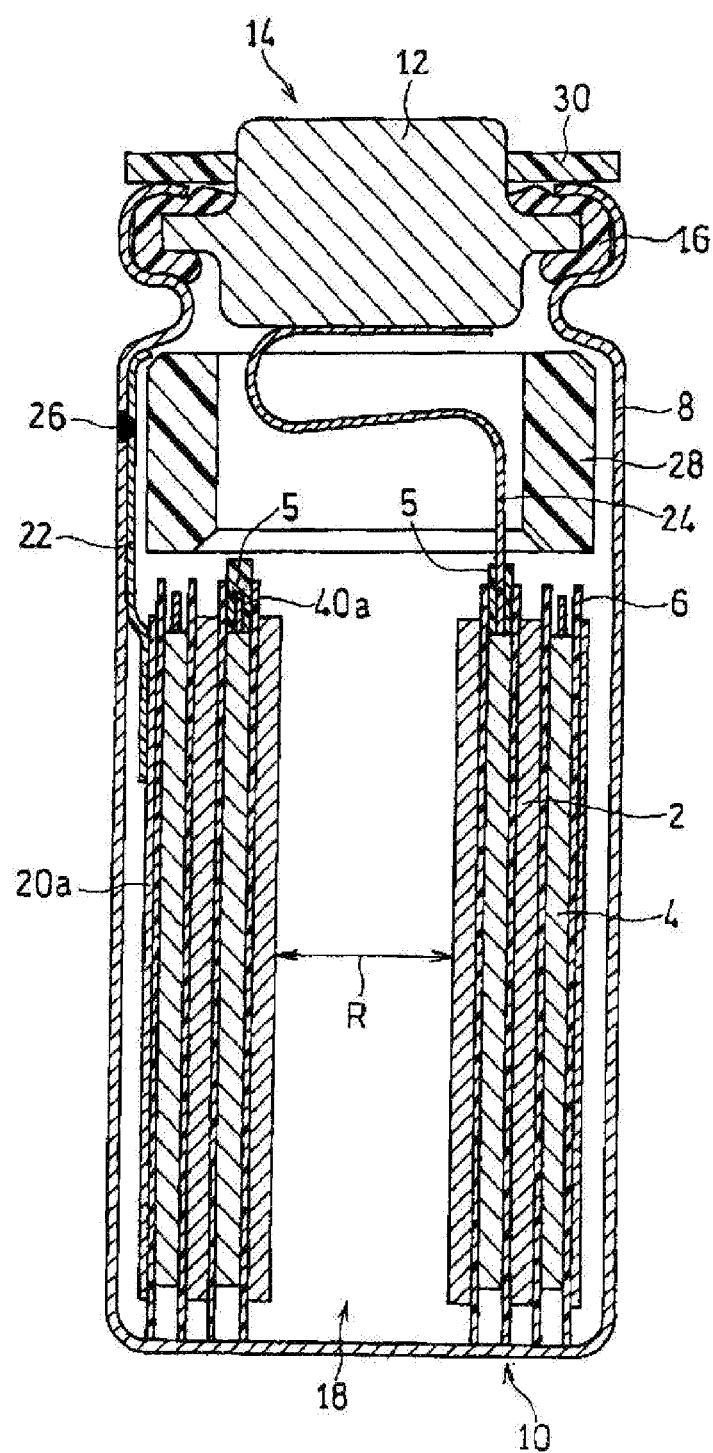
FIG. 7 is a vertical sectional view of a cylindrical winding-type battery in accordance with another exemplary embodiment of the present invention.

In the shown example, the whole surface—including the edge surface—of first uncoated portion 40a is covered with insulating layer 5. However, the relationship between first uncoated portion 40a and insulating layer 5 is not limited to this. For example, as shown in FIG. 7, just a part (for example, one periphery) of first uncoated portion 40a may be covered with insulating layer 5. In this case, separator 6 is required to project, to the first end-surface side, more than a portion of first uncoated portion 40a that is not covered with insulating layer 5.

(Separator)

As separator 6 interposed between positive electrode 4 and negative electrode 2, an insulating microporous thin film, woven fabric, or nonwoven fabric is employed. As the material of the separator of a lithium-ion battery, preferably, polyolefin such as polypropylene or polyethylene is employed, for example. That is because polyolefin has a high durability and has a shutdown function. The thickness of separator 6 is for example 10 µm to 50 µm, preferably 10 µm to 30 µm, more preferably 10 µm or more and less than 20 µm. The microporous thin film may be a monolayer film or multilayer film. The porosity of the separator is preferably 30% to 70%, more preferably 35% to 60%.

(Non-aqueous Electrolyte)

A non-aqueous electrolyte may be in any state of liquid, gel, or solid. A liquid non-aqueous electrolyte used for a lithium-ion battery generally includes lithium salt and a non-aqueous solvent in which the lithium salt is dissolved. The non-aqueous solvent is not particularly limited. As the non-aqueous solvent, cyclic carbonate, chain carbonate, or cyclic carboxylic acid ester is employed. As the cyclic carbonate, polypropylene carbonate or ethylene carbonate is employed. As the chain carbonate, diethyl carbonate, ethyl methyl carbonate, or dimethyl carbonate is employed. As the cyclic carboxylic acid ester, γ-butyrolactone or γ-valerolactone is employed. As the lithium salt, $LiPF_6$ or $LiBF_4$ is employed, for example.

The above-mentioned exemplary embodiment is just an example of the present invention, and the present invention is not limited to the exemplary embodiment. The present invention is preferably applied to various non-aqueous electrolyte batteries represented by a lithium-ion battery. The battery may be a primary battery or secondary battery. The shape of the battery is required to be a tubular shape, and may be a cylindrical shape or elliptical cylindrical shape. The size of the battery is not limited either. The technological significance of applying the present invention is enhanced when the tubular portion of the battery case has an outer diameter of 10 mm or less, furthermore 6 mm or less, especially 4.5 mm or less.

The present invention is applicable to a winding-type battery, and is especially useful for manufacturing a small cylindrical winding-type battery having a high capacity.

The invention claimed is:

1. A battery comprising:
   a power generating element; and
   a battery case accommodating the power generating element,
   wherein the power generating element includes:
   a first electrode;
   a second electrode having a polarity different from a polarity of the first electrode;
   a separator interposed between the first electrode and the second electrode; and
   an electrolyte, and
   the first electrode and the second electrode are wound via the separator to form an electrode group having a first end and a second end opposite to the first end,
   wherein the first electrode includes a first current collector sheet and a first active material layer formed on a surface of the first current collector sheet, and a first current collecting lead is electrically coupled to the first current collector sheet,
   wherein the second electrode includes a second current collector sheet and a second active material layer formed on a surface of the second current collector sheet, and a second current collecting lead is electrically coupled to the second current collector sheet,
   wherein the first current collector sheet has a first side located at the first end of the electrode group, the first side having one end connected to an adjacent second side of the first current collector sheet and another end connected to an adjacent third side of the first current collector sheet,
   wherein the first side of the first current collector sheet includes a first uncoated portion extending throughout the first side from the one end to the another end, the first uncoated portion not having the first active material layer on either surface of the first current collector sheet,
   wherein the first current collecting lead is coupled to the first uncoated portion,
   wherein an edge surface of the first uncoated portion is at least partially covered with an insulating layer, the edge surface extending in a thickness direction of the first current collector sheet, and
   wherein the insulating layer projects more than the separator at the first end of the electrode group.

2. The battery according to claim 1, wherein
   the edge surface of the first uncoated portion is covered with the insulating layer by at least 50% or more of one periphery of the electrode group.

3. The battery according to claim 1, wherein
   at least one of the first current collecting lead and the second current collecting lead is projected and extended from the first end.

4. The battery according to claim 1, wherein
   the battery case includes a metal-made tubular portion, and
   the first current collecting lead or the second current collecting lead is welded to a connection position on an inner surface of the metal-made tubular portion, the connection position not facing the electrode group.

5. The battery according to claim 4, wherein
   a shortest distance between the insulating layer and the connection position in a winding axis direction is 0.3 mm or more and 3 mm or less.

6. The battery according to claim 1, wherein
   the insulating layer includes a pair of insulating tapes, and
   by grasping the first uncoated portion with the pair of insulating tapes from both sides of the first uncoated portion, the edge surface of the first uncoated portion is covered with the insulating layer.

7. The battery according to claim 6, wherein
   a thickness of the insulating layer is 15 μm or more and 50 μm or less.

8. The battery according to claim 1, wherein
   the battery case includes a metal-made tubular portion, and
   an outer diameter of the metal-made tubular portion is 10 mm or less.

9. The battery according to claim 1, wherein
   the battery case includes a bottomed metal can having a metal-made tubular portion and a sealing member for blocking an opening in the bottomed metal can, and
   the first end is disposed on an opening side.

* * * * *